(12) United States Patent
Bishop et al.

(10) Patent No.: US 6,393,411 B1
(45) Date of Patent: May 21, 2002

(54) DEVICE AND METHOD FOR AUTHORIZED FUNDS TRANSFER

(75) Inventors: Richard Leslie Bishop, San Francisco, CA (US); Robert Peter Freeman, Chelmsford (GB)

(73) Assignee: Amdahl Corporation, Sunnyvale, CA (US)

(*) Notice: Subject to any disclaimer, the term of this patent is extended or adjusted under 35 U.S.C. 154(b) by 0 days.

(21) Appl. No.: 09/119,805

(22) Filed: Jul. 21, 1998

(51) Int. Cl.$^7$ ................................................. G06F 17/60
(52) U.S. Cl. ................................... 705/44; 70/39; 70/41
(58) Field of Search ........................... 705/39, 41, 44; 235/380; 380/24

(56) References Cited

U.S. PATENT DOCUMENTS

| | | | | |
|---|---|---|---|---|
| 5,371,797 A | * | 12/1994 | Bocinsky, Jr. | 705/70 |
| 5,864,830 A | * | 1/1999 | Armetta et al. | 705/41 |
| 5,902,983 A | * | 5/1999 | Crevelt et al. | 235/80 |
| 5,949,876 A | * | 9/1999 | Ginter et al. | 705/80 |
| 5,956,699 A | * | 9/1999 | Wong et al. | 705/39 |

OTHER PUBLICATIONS

VeriFone Introduces Plans for Personal ATM and VeriSmart to Fuel Smart Card infrastructure; Major Device Manufacturers Ready Solutions to Accelerate Electronic Cash; HP Key Tronic, WebTV Join Other Industry Leaders In Supporting VeriFone Plans. Business W, Sep. 30, 1996.*

Future money and banks: 1990–2010. A special Issue On Banking, Its Future and Antitrust Analysis. Solomon, Elinor H. Antitrust Bulletin, 37, n3, 799–832, Fall 1992.*

Smartcards smarter than passwords. ( System security using token–based authentication) (includes a related article on smartcard security system for portable computers. Wood, Lamont. Datamation, v37, n14, p69(2), Jul. 15, 1991.*

* cited by examiner

*Primary Examiner*—Allen R. MacDonald
*Assistant Examiner*—M. Irshadullah
(74) *Attorney, Agent, or Firm*—David E. Lovejoy

(57) ABSTRACT

A secure funds device for use with a computer system, such as a personal computer, for transferring funds, in response to a funds transfer request for amounts of funds from the computer system, to a funds receiver. One or more electronic cash devices store electronic funds and transfer funds in response to funds transfer request when authorized by an authorization signal. A processor is used for connecting the funds transfer request from the computer system to the electronic cash device and for transferring electronic funds from the electronic cash device to the computer system when the authorization signal is present. User control means, including for example a pushbutton switch and an LCD display, that is not accessible by the computer system is used for providing the authorization signal. The secure funds device has a secure interface that prevents the computer system from generating the authorization signal. The present invention prevents a computer from making unauthorized transfers from a electronic cash device such as a smart card.

60 Claims, 6 Drawing Sheets

DEVICE AND METHOD FOR AUTHORIZED FUNDS TRANSFER

BACKGROUND OF THE INVENTION

The present invention relates to the field of electronic commerce and more particularly to methods and apparatus for secure electronics funds transfer.

In the field of electronic commerce, electronic cash is an electronic method for the transfer of value that involves the transfer of funds from one party to another. Electronic cash methods include two types of transfers, from an electronic cash device held by one party to an electronic cash device held by another, namely certificated value and net value transfers.

For the certificated value type of electronic cash, an issuer generates electronic value or transaction records, generally cryptographically encoded and signed, that represent distinct amounts of value. These electronic value or transaction records may be passed from one electronic cash device to another electronic cash device. For example, the transfer of funds occurs from a small portable electronic cash device (smart card) in the possession of one party to an electronic cash device in the possession another party. Typically, an electronic cash device for certificated value is issued by the issuer and dispensed to a first party (for example, a purchaser) where the card is preloaded or subsequently loaded with stored electronic value or transaction records (certificates), the electronic value record (certificate) is passed by the first party to an electronic cash device of another party (for example, a merchant) and, eventually, the electronic value record (certificate) is returned to the issuer by the other party for redemption in the amount of the electronic value record (certificate). Usually, electronic cash devices used by merchants, banks and other financial institutions are under the administrative and technical control of an issuer.

For the net value type of electronic cash, the electronic value is represented by the net amount stored in an electronic cash device without need for further external accounting. Specifically, in the net value type of electronic cash, the value is not represented by electronic certificates or transaction records that must be transferred to and redeemed from an issuer. The net value type of electronic cash device is capable of storing a net amount of value that reflects the accumulated aggregate of value transfers from and to that net value electronic cash device from other net value electronic cash devices.

Net value electronic cash devices can be implemented using devices that are similar to those used for the certificated value type of electronic cash except that the rules controlling the transfer of value are appropriate for the net value type of electronic cash.

In an electronic funds system, merchants, banks or other institutions are the issuers that issue electronic cash devices to customers. Typically, these electronic cash devices are issued in the form of a smart card, which is a device containing internal electronic components that is packaged in a standardized manner similar in form and size to a common credit or debit card. The terms electronic funds and electronic cash include money, frequent flyer miles or any other measure of value.

The secure operating modes for electronic cash cards are frequently manually implemented and frequently employ a data key such as a Personal Identification Number (PIN). In one commonly used implementation, an electronic cash card may be locked to inhibit the normal action of removing electronic funds so that restoration of the ability to remove electronic funds from the card that becomes disabled or locked requires use of a previously determined PIN to unlock the card. The PIN number may or may not be changeable depending on the design of the card. In another PIN implementation, a PIN number is required for the lock operation as well as for the unlock operation. The lock and unlock PIN numbers may be the same or different and they each may be fixed or changeable. In a high-security variation, a PIN number unique to the lock operation must be supplied with the lock operation and also to reverse the lock operation. This variation is sometimes called a single-use key method. In another high-security variation, the electronic cash device requires the presentation of the PIN number before every occurrence of some or all operations, but the relocking is automatic after each operation.

Although PIN locking is useful to prevent unauthorized transfer of funds from an electronic cash device when it is locked and so is not in use, it does not prevent unintended extraction of funds when the electronic cash device is in use, as when in use connected to a computer system for payment of goods or services to a remote vendor.

By way of example, the intrusions into computing systems could be introduced from any of the following sources:

Deceitfully an application or operating system in a computer could contain instructions waiting for a special circumstances so that the developer or distributor of the application or operating system could defraud the user, a "Trojan horse" waiting for activation.

As an unintended side effect of an apparently unrelated operation, a user of the computing system could introduce code, a "virus", that corrupts an application or the operating system with deleterious effects.

In a network, code (possibly transient), an "applet", that has unaccounted side effects may be introduced by the receiver of funds.

As an alternative to using the display and data entry devices of computing systems, full function devices including a keyboard have been built or adapted to connect to computing systems for control of funds transfers. The full function devices typically have the disadvantages that:

They are costly in the sense that they require the additional size and/or cost of a keyboard and other full functionality.

They require keying or re-keying of the amount of electronic funds to be transferred which is time consuming and error prone.

They do not allow keying of a limit amount that may be transferred in increments over time, an action that is desirable when paying for a resource as it is used, a per-page of information or a per-minute of use fee, for example.

In light of the problems of prior art systems, there is a need for improved methods and apparatus for secure electronics funds transfers.

SUMMARY OF THE INVENTION

The present invention is a secure funds device for use with a computer system, such as a personal computer, for transferring funds, in response to a funds transfer request for amounts of funds from the computer system, to a funds receiver. One or more electronic cash devices store electronic funds and transfer funds in response to funds transfer requests when authorized by an authorization signal. A processor is used for connecting the funds transfer request from the computer system to the electronic cash device and for transferring electronic funds from the electronic cash device to the computer system when the authorization signal is present. User control means, including for example a visual or audio indicator and a pushbutton switch actuator that are not directly accessible by the computer system, are used for providing the authorization signal. The secure funds device has a secure interface that prevents the computer system from generating the authorization signal and hence the present invention prevents a computer from making unauthorized transfers from a electronic cash device. The electronic cash device and any of selected parts of or all of the secure funds device may be implemented as a smart card, including a card reader, whereby the smart card is protected from unauthorized transfers by the computer.

The secure funds device operates in sessions that include a preparation phase where the computing system prepares the secure funds device for the remote transfer of electronic funds for the fund receiver, an authorization phase where the secure funds device displays the amount of the funds transfer and generates the authorization signal in response to depression of a user button or other actuator, and a funds transfer phase where the secure funds device cooperates with the computing system to perform the electronic signaling required for the transfer of electronic funds to the funds receiver.

The foregoing and other objects, features and advantages of the invention will be apparent from the following detailed description in conjunction with the drawings.

DETAILED DESCRIPTION

Figure 1:
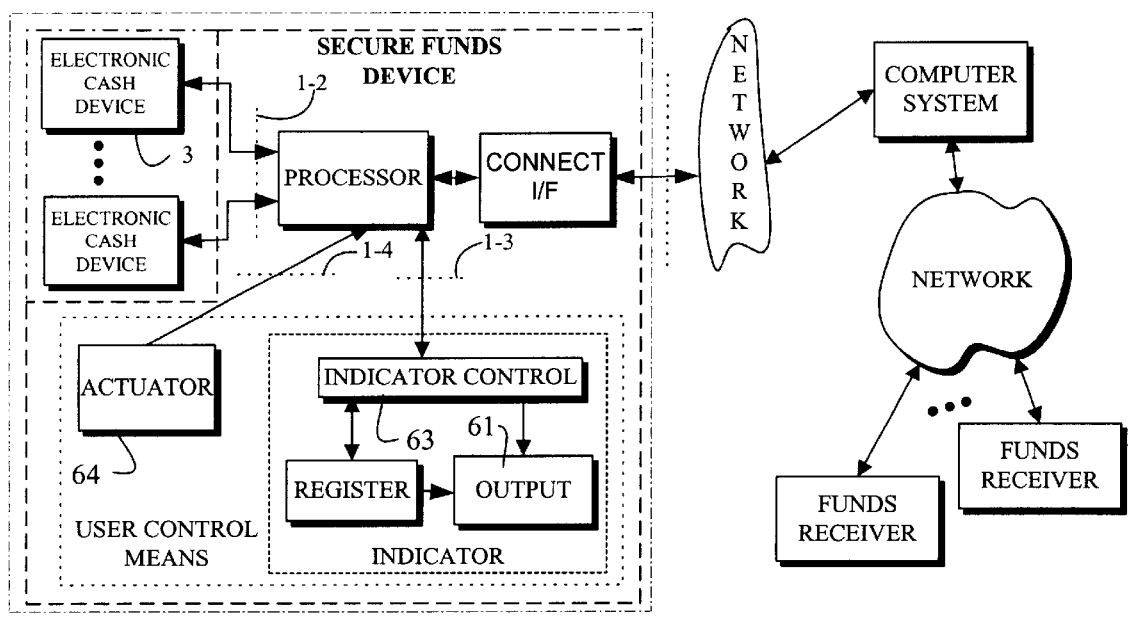
FIG. 1 depicts a block diagram of a funds transfer system that includes a secure funds device of the present invention.

FIG. 1 depicts a secure funds device 2 which includes or connects to one or more individual electronic cash devices 3 through a connection interface 1-2, includes processor 4, includes a connect interface 17, and includes user control means 11 for display or other output of the amount of and the authorization status of the funds transfer request and for generation of an authorization signal. The user control means 11 includes an indicator 65 formed by an indicator control 63, a register 62 and an output 61 and includes an actuator 64. The control 63 connects to processor 4 and in response to commands from processor 4 loads values into the register 62 and controls the visual or other indicator function of output 61. The actuator 64 connects to processor 4 and upon actuation provides the authorization signal. Typically the secure funds device 2 is used by a person in possession of the secure funds device 2 to pay a vendor of goods or services. The secure funds device 2 is connected through a connect interface 17 and network 12 to the computer system 7. The computer system 7 is connected through a network 9 to potentially many funds receivers 10. Typically, funds receivers 10 are in the control of vendors of the goods or services and are used to accumulate funds from secure funds device 2 and similar devices. The secure funds device 2 is incased in a housing 66 physically detached from the computer system 7 and electronically connected over the interface 1-1 for communication with the computer system 7. The housing 66 can be any form of container for electronic equipment that is convenient for a user and typically is similar to a handheld remote control device like those used for automobile locks or television receivers. Larger housings are, of course, possible for larger installations.

The electronic cash devices 3 are devices for containing amounts of and transferring electronic funds. A electronic cash device 3 typically contains a variable quantity of electronic funds, the means for reading the amount of funds contained therein, and means for transferring fund values in and out of the electronic cash device. More than one electronic cash device 3 may be present and, for example, each of several electronic cash devices may contain a different currency. Also, the electronic cash devices may be included in a physical device such as a smart card. The electronic cash devices 3 may be fixed or removable devices that physically are part of the secure funds device 2 or may be separate devices not physically part of the secure funds device 2 but which connect to the device 2 through contacts across interface 1-2, in which case, the electronic cash devices are typically removably contained in a smart card reader. When the electronic cash devices are part of the secure funds device 2, then the boundary of secure funds device 2 is extended in FIG. 1 to include 2'.

The secure funds device 2 contains a processor 4 and user control means 11 and, with or without electronic cash devices 3, is integrated into a single low cost device suitable for widespread distribution. The output 61 is typically a liquid crystal display (LCD), audio output device, or similar display that displays the value of the display register 62 under control of the indicator control 63. The amount displayed on the output 61 is the amount of funds authorized for transfer or the amount of funds requested for authorization as a result of the operation of the secure funds device 2. The actuator 64 is typically a momentary contact button switch for providing an authorization signal across interface 1-4 for signifying authorization.

The processor 4 is connected to a computer system 7 by network 12. Network 12 is typically a direct local connection, a telephone line connection, or an internet or other network connection. Computer system 7 may be a personal computer (PC) used for electronic commerce by any person who directly controls the computer system 7, using the display and controls typically provided for these devices, as a participant in electronic commerce, in which case the "network" 12 typically is implemented as a direct connection. In other cases, the computer system 7 may be associated with a vendor of goods or services, for example a merchant or other remote seller such as a vendor of on-line information. In this case, the computer system may be remote from the secure funds device 2 and may depend on automated processes for participation in electronic commerce.

The computer system 7 connects to one of potentially many funds receivers 10 through a network 9, which may be a direct local connection, a telephone line connection, an internet connection or other computer network connection. If the computer system 7 is directly controlled by an individual, network 9 typically is a remote connection. If the computer system 7 is associated with a vendor of goods or services, then network 9 typically is a direct connection. A funds receiver 10 typically includes another electronic cash device or other mechanism for receiving funds under control of the the vendor of goods or services.

In FIG. 1, the computer system 7 connects through the connect interface 17 to the processor 4 in device 2 through an electronic interface 1-1. The interface 1-1 operates with a funds transfer protocol that permits the computer system 7 to mediate the transfer of funds between the electronic cash devices 3 attached to processor 4 in device 2 and the funds receiver 10. The interface 1-1 receives requests from the computer system 7 which include for example startup or reinitialized request (START request), the clear previous status request (CLEAR_REQ request), the authorization request (AUTH_REQ request) and the transfer request (XFR_REQ request), receives responses from the computer system 7 which include for example the clear acknowledge response (CLEAR_ACK) response, the request acknowledge response (REQ_ACK response), and the request not acknowledged response (REQ_NACK response), and other signals useful for funds transfer.

In FIG. 1, the electronic cash devices 3 connect to the processor 4 of device 2 through an electronic interface 1-2. The interface 1-2 operates with a funds transfer protocol in response to requests on the interface 1-1 that permits, when authorized, the electronic transfer of funds between electronic cash devices 3 and the funds receiver 10. In addition to the interface signals used for funds transfer, interface 1-2 includes commands from processor 4 that allow determination of signals that indicate the availability and state of the electronic cash devices 3; for example, a smart card is inserted and otherwise available for funds transfer (CARD_OK signal).

In FIG. 1, the indicator control 63 connects to the processor 4 through an electronic interface 1-3. The interface 1-3 operates with a display protocol that permits the display of the funds transfer activity between the electronic cash devices 3 and the funds receiver 10. The display may be visual or audio. The interface 1-3 includes, for example, commands to set the contents (DISP_AMT) of display register 62 for indicating the amount of the funds transfer that is authorized or requested to be authorized for transfer from a electronic cash device 3, and commands to direct visual aspects of the display that indicate the value transfer status of the secure funds device 2. The display BLANK state, for example, is used to signify that a electronic cash device 3 is not enabled (for example, an electronic cash device 3 is missing or an electronic cash device 3 is not OK for some reason) and that there is no pending request from the computer system 7. The FAST_BLINK state, which fast blinks the amount of funds requested for authorization to transfer from a electronic cash device 3, for example indicates that a request has been received from the computer system 7 and that the electronic cash device 3 is not enabled. This is an indication that the user should make ready a electronic cash device 3 if the user wishes to allow the transfer of the flashed amount of funds. The SLOW_BLINK state which slow blinks the amount of funds requested for authorization to transfer from the electronic cash device 3, for example, indicates that a request has been received from the computer system 7 and that the electronic cash device 3 is enabled and ready for funds transfer. This is an indication that the user should actuate the actuator 64 if the user wishes to authorize transfer of the flashed amount of funds. The STEADY state which displays a steady image of the amount currently authorized for transfer, indicates that the actuator 64 has been actuated at the proper time so that the transfer from the electronic cash device 3 may proceed as authorized under control of processor 4 in response to requests from computer system 7 to transfer no more than the amount displayed. In other implementations, the status of the transfer may be shown by separate indicators or by different coding of the presentation, for example by use of separate indicators to code transfer status.

In FIG. 1, the actuator 64 connects to the processor 4 within device 2 through an electronic interface 1-4. The interface 1-4 operates with an authorization protocol authorization signal (OK_SIG signal) generated by actuator 64 in response to actuation that authorizes the electronic transfer of funds in the amount displayed by output 61.

The components of device 2 including electronic cash devices 3 (or connections thereto), processor 4, user control means 11 (including actuator 64 and output 61) have the interfaces 1-1, 1-2, 1-3 and 1-4 isolated so that the computer system 7 cannot effectuate any funds transfer from a electronic cash device 3 without authorization by the processor 4. Subject to the authorization operation provided by the device 2, the computer system 7 controls the electronic funds transfer between electronic cash devices 3 and the funds receiver 10.

For the signal connections to the processor 4, alternate signals may be substituted for the signals shown, provided that the alternate signals cumulatively include the semantic effect of the signals identified above. For example, separate CARD_INSERTED and CARD_OK signals may be provided instead of a single CARD_OK signal that includes both conditions.

Figure 2:
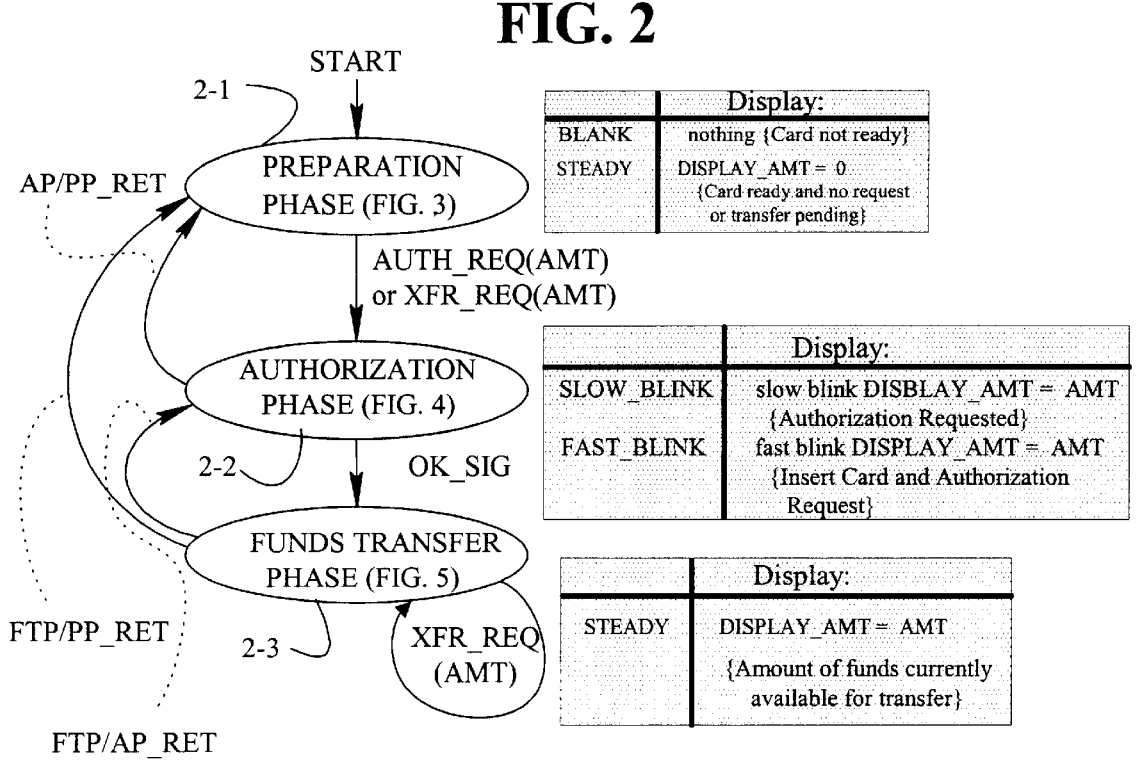
FIG. 2 depicts a block diagram representation of the phases of operation of the secure funds device of FIG. 1.

Operation Phases—FIG. 2

In FIG. 2, the different phases of operation of the system of FIG. 1 are shown and include the PREPARATION PHASE (PP) 2-1, the AUTHORIZATION PHASE (AP) 2-2 and the FUNDS TRANSFER PHASE (FTP) 2-3. As a result of operation of a computer system 7, initiated for example on behalf of a funds receiver 10, a transaction is established that calls for the authorization or the transfer of electronic funds from a electronic cash device 3 controlled by secure funds device 2 to the funds receiver 10.

The secure funds device 2 starts processing in the PREPARATION PHASE 2-1, when power is supplied to the secure funds device 2, or when computer system 7 sends a START request on interface 1-1. The PREPARATION PHASE 2-1 may also be entered by a return from the AUTHORIZATION PHASE 2-2 (AP/PP_RET) or from the FUNDS TRANSFER PHASE 2-3 (FTP/AP_RET). The START request may have the effect of starting, restarting, or resetting the electronic cash devices 3. In PREPARATION PHASE 2-1, the secure funds device 2 is conditioned to initiate an authorization process that authorizes the transmission of electronic funds from a electronic cash device 3 to the funds receiver 10. In the PREPARATION PHASE 2-1, no authorization is pending. Depending on the demands of the funds receiver and the processing of computer system 7, either an authorization request (AUTH_REQ request) from the computer system 7 to start an authorization of an authorized amount (AMT) or a transfer request (XFR_REQ request) to start a transfer of a transfer amount (AMT) flows from PREPARATION PHASE 2-1 to the AUTHORIZATION PHASE 2-2. The AUTHORIZATION PHASE 2-2 presents an amount for authorization, and when authorized by the OK_SIG generated by actuator 64 flows to the FUNDS_TRANSFER PHASE 2-3. Cancellation of the request by computer system 7 with a CLEAR_REQ request, or, for example, removal of a previously correctly inserted electronic cash device 3 causes a return (AP/PP_RET return) back to the PREPARATION PHASE 2-1. The FUNDS TRANSFER PHASE 2-3 accomplishes one or more transfers of value from the electronic cash device 3 to the funds receiver 10 in amounts not exceeding the authorized amounts. In the case that the FUNDS TRANSFER PHASE 2-3 was entered as the result of an AUTH_REQ request, value transfer requires one or more subsequent XFR_REQ requests. In response to a CLEAR request from computer system 7, a rejected or failed value transfer, or exhaustion in the funds available for transfer, the FUNDS TRANSFER PHASE 2-3 flows back to the PREPARATION PHASE 2-1 with a return (AP/PP_RET return). In response to a new AUTH_REQ request from computer system 7, the FUNDS TRANSFER PHASE 2-3 flows back to the AUTHORIZATION PHASE 2-2 for authorization of a new amount.

Figure 3:
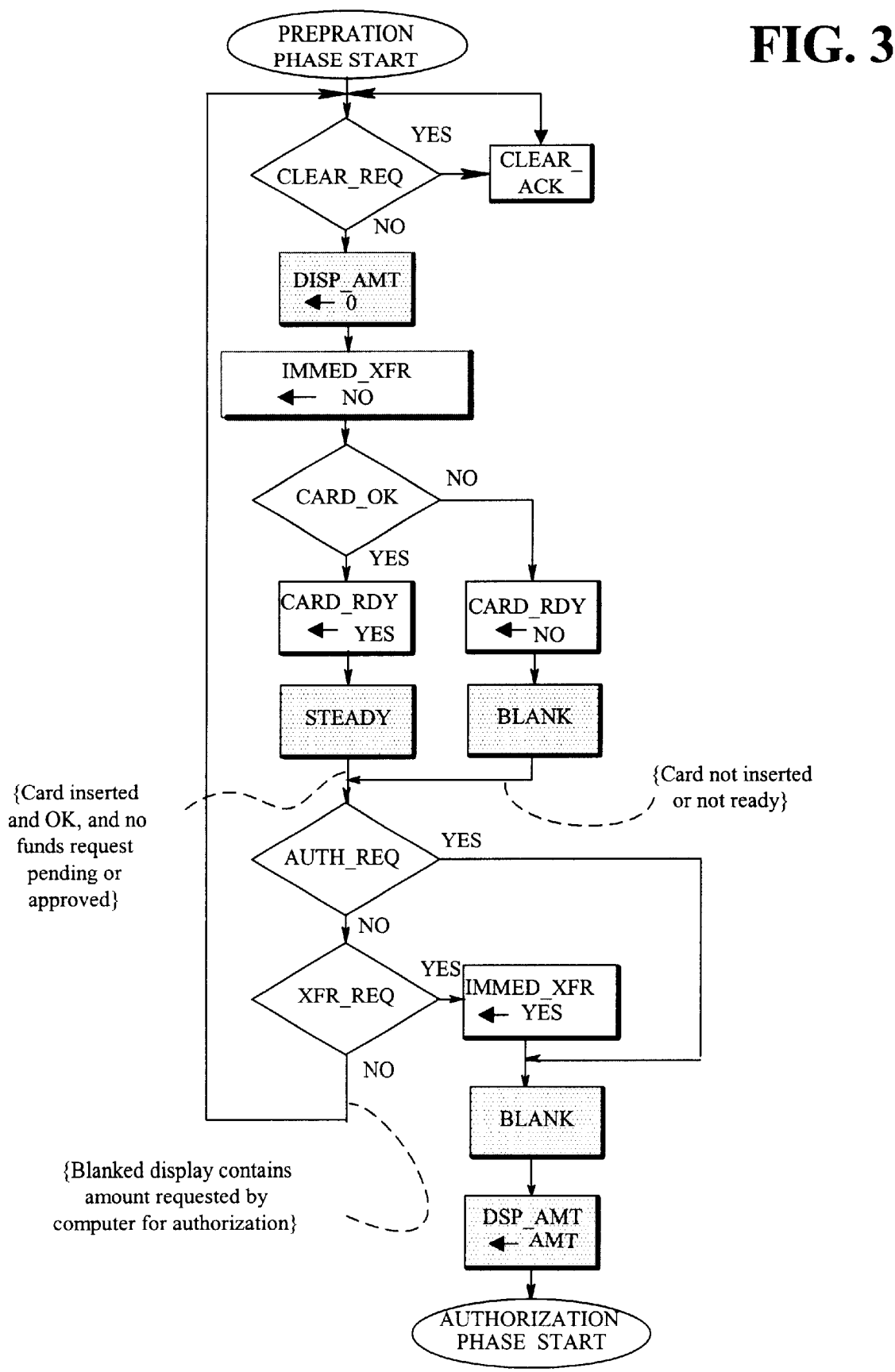
FIG. 3 depicts a block diagram representation of the preparation phase of FIG. 2.

Preparation Phase—FIG. 3

The PREPARATION PHASE (PP) 2-1 of FIG. 2 is shown in flowchart form in FIG. 3. In FIG. 3, the process of the PREPARATION PHASE 2-1 starts at PREPARATION PHASE START and flows to the clear test (CLEAR_REQ test). In general, the CLEAR_REQ test returns a YES result if there is a new CLEAR_REQ request from computer system 7, and returns a NO result otherwise. A YES result to the CLEAR_REQ test flows to the clear request acknowledge task (CLEAR_ACK task). The CLEAR_ACK task sends a CLEAR_ACK response to computer 7. The CLEAR_REQ may be used by a computer system 7 as a part of normal processing to force the secure funds device 2 to the PREPARATION PHASE 2-1 as the first step in a sequence of requests. In the case the CLEAR_REQ request is issued by computer system 7 when the secure funds device 2 already is in the PREPARATION PHASE 2-1, the effect in the secure funds device 2 is an acknowledgment of the request by the secure funds device 2.

A NO result flows to the zero-the-display-amount task (DISP_AMT←0 task) that resets a display register 62 (DISP_AMT) and flows to the state setting task that resets the immediate transfer indicator (IMMED_XFR←NO task). After these two resets, the processing flows to the card test (CARD_OK task). The CARD_OK test returns a YES result if a electronic cash device 3 is correctly inserted and otherwise is available to respond to requests for funds transfer, and returns a NO result otherwise. A NO result to the CARD_OK test flows through the state setting task that sets the card state as not ready (CARD_RDY←NO task) which flows to the display state setting task that causes the output 61 to display no value (the BLANK task). A YES result to the CARD_OK test flows through the state setting task that set the card state as ready (CARD_RDY←YES task) which flows to the display state-setting task that causes the output 61 to display as steady value the amount (DISP_AMT) contained in display register 62 (the STEADY task), which has previously been set to the value zero. After either the STEADY or BLANK tasks, the flow is to a new authorization request test (AUTH_REQ test). The AUTH_REQ test returns a YES result if there is a new AUTH_REQ request from computer system 7, and returns a NO result otherwise. The AUTH_REQ request from computer system 7 requests authorization, by activation of the actuator 64, for transfer of a specific amount of value (AMT) by the secure funds device 2 from electronic cash device 3. Depending on the design of the secure funds device 2 and following requests from computer system 7, the authorized amount may be transferred in one or more subsequent requests. A NO result from the AUTH_REQ test flows to the new transfer request test (XFR_REQ test). The XFR_REQ test returns a YES result if there is a new XFR_REQ request from computer system 7, and returns a NO result otherwise. A XFR_REQ request received in the PREPARATION PHASE 2-1 requests authorization, by activation of actuator 64, and the immediate subsequent transfer of a specific amount of value (AMT) by the secure funds device 2 from the electronic cash device 3. A YES result from the XFR_REQ test flows to a state setting task that sets the request state to indicate that a request for immediate transfer has been received from computer system 7 (IMMED_XFR←YES task. A NO result to the XFR_REQ test flows back to PREPARATION PHASE START at the beginning of FIG. 3.

A YES result from the AUTH_REQ test or the completion of the IMMED_XFR←YES task flows to the BLANK task that will cause the display to momentarily blank in anticipation of further action in the AUTHORIZATION PHASE 2-2. After the BLANK task, the flow is to the DISP_AMT ←AMT task that sets the display register 62 of user control means 11 to the amount (AMT) that was passed to the processor 4 from the computer system 7 with the AUTH_REQ or XFR_REQ. From the DISP_AMT←AMT task, the flow is to the AUTHORIZATION PHASE START of FIG. 4.

Figure 4:
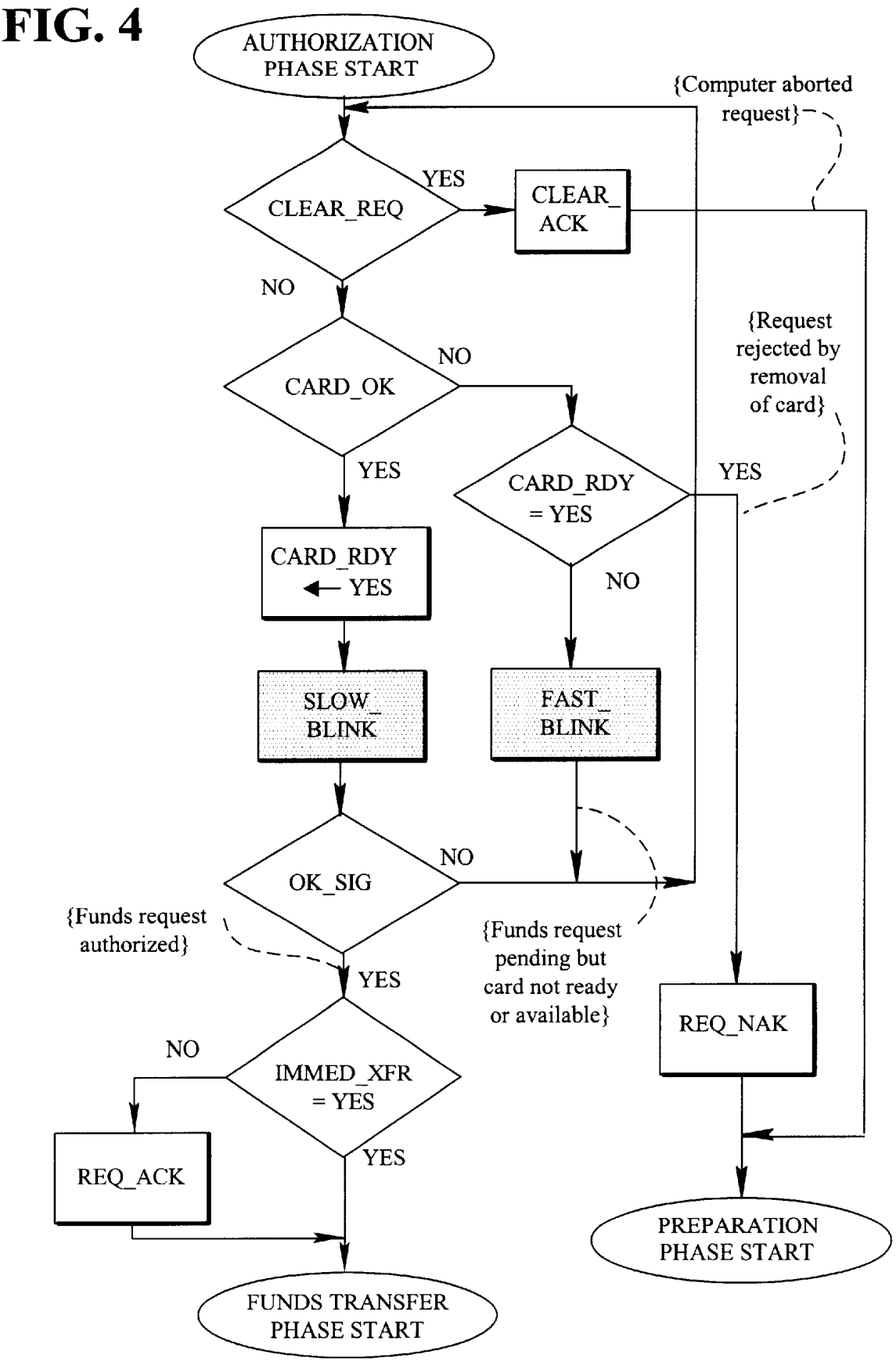
FIG. 4 depicts a block diagram representation of the authorization phase of FIG. 2.

Authorization Phase—FIG.4

The AUTHORIZATION PHASE (AP) 2-2 of FIG. 2 is shown in flowchart form in FIG. 4. During the AUTHORIZATION PHASE 2-2, the secure funds device 2 displays as a blinking number the amount for which authorization is requested. This amount may be the maximum amount authorized for transfer over a "session" as set by the AUTH_REQ request or may be the current transfer amount for which authorization is requested as set by the immediate transfer XFR_REQ request. A user at the secure funds device 2 signals "ok" to the amount by the actuation of the actuator 64 which is integral to the device 2 and is not a part of the computer system 7. Secure funds device 2 guarantees to the user that the transaction involving the electronic cash device 3 is under control of the user for an authorization of funds transfer and not under unauthorized control of the computer system.

In FIG. 4, the process of the AUTHORIZATION PHASE 2-2 starts at AUTHORIZATION PHASE START and flows to the clear test (CLEAR_REQ test). A YES result from the CLEAR_REQ test flows through the CLEAR_ACK task which flows through an AP/PP_RET return to the PREPARATION PHASE START of FIG. 3. A NO result to the CLEAR_REQ test flows to the CARD_OK test. In the AUTHORIZATION PHASE 2-2 the CARD_OK test may include testing for sufficiency of funds in the electronic cash devices to support the AMT requested in the XFR_REQ request or the AUTH_REQ request. A YES result to the CARD_OK test flows to the state setting a task that sets the card ready state (CARD_RDY←YES task) which flows to the SLOW_BLINK task causing the output 61 to blink the DISP_AMT at a perceptibly slow rate, indicating that a funds request is pending on an available card and requesting authorization by actuation of actuator 64. After the SLOW_BLINK task, the flow is to a user authorization input test (OK_SIG test) that tests for the actuation of the actuator 64 caused, for example, by a user pressing a momentary contact button switch. After a YES result for the OK_SIG test, the flow is to the immediate transfer state test (IMMED_XFR=YES test). The IMMED_XFR=YES test returns YES if the most recent assignment, in the PREPARATION PHASE 2-1, of the state variable IMMED_XFR was to YES, and a NO result otherwise. A NO result to the IMMED_XFR=YES test, indicating that the AUTHORIZATION PHASE 2-2 was entered not by a XFR_REQ request but rather by an AUTH_REQ request, flows to the request acknowledge task (REQ_ACK task) that sends the REQ_ACK acknowledgment response to the computer system 7 that indicates acknowledgment that AUTH_REQ request did complete successfully. A YES result to the IMMED_XFR=YES test or the completion of the REQ_ACK task flows to the FUNDS TRANSFER PHASE START of FIG. 5.

A NO result to the CARD_OK test flows to the test of the card ready state (CARD_RDY=YES test). A NO result of the CARD_RDY=YES test flows to the FAST_BLINK task, causing the output 61 to blink the DISP_AMT at a fast rate, indicating that a funds request is pending but the card is not ready or otherwise available. A YES result from the CARD_RDY=YES (which, following a NO result from the CARD_OK test indicates removal of the smart card) flows to the reject request task (REQ_NAK task). The REQ_NAK task sends a REQ_NAK acknowledgment response to the computer system 7 that indicates that the AUTH_REQ request did not completed successfully and generates the AP/PP_RET return to the PREPARATION PHASE START. The CARD_RDY=YES test accomplishes the effect of rejecting a request from computer 9 where a smart card that previously was inserted is withdrawn. In an alternate implementation, this rejection of funds transfer could be accomplished with a separately generated reject signal used as an alternative to OK signal. After either the FAST_BLINK task or a NO result for the OK_SIG test, the flow loops back to the CLEAR_REQ test after the AUTHORIZATION PHASE START of FIG. 4 waiting for one of the conditions that will cause an exit from the phase.

Figure 5:
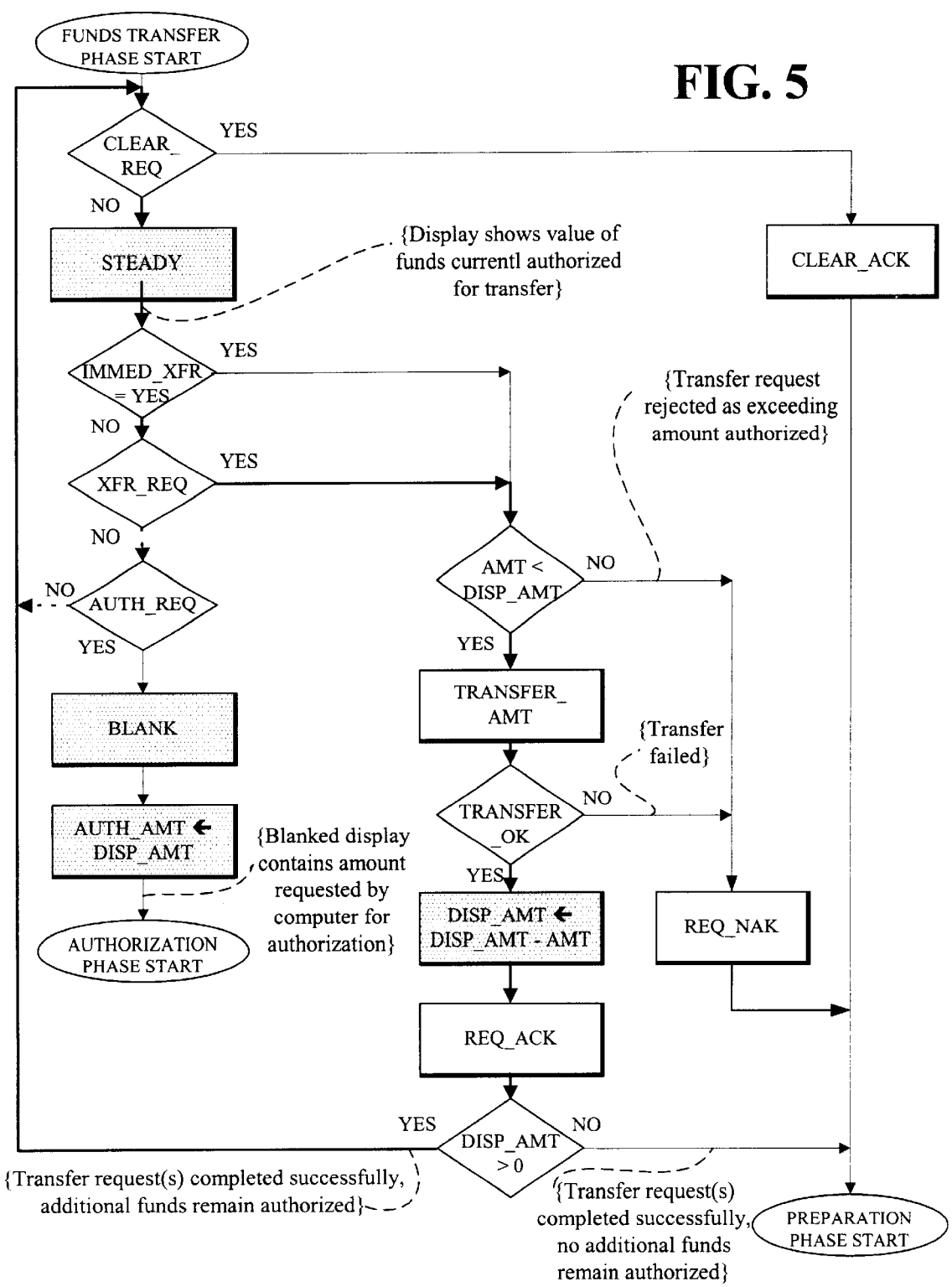
FIG. 5 depicts a block diagram representation of the funds transfer phase of FIG. 2.
Figure 6:
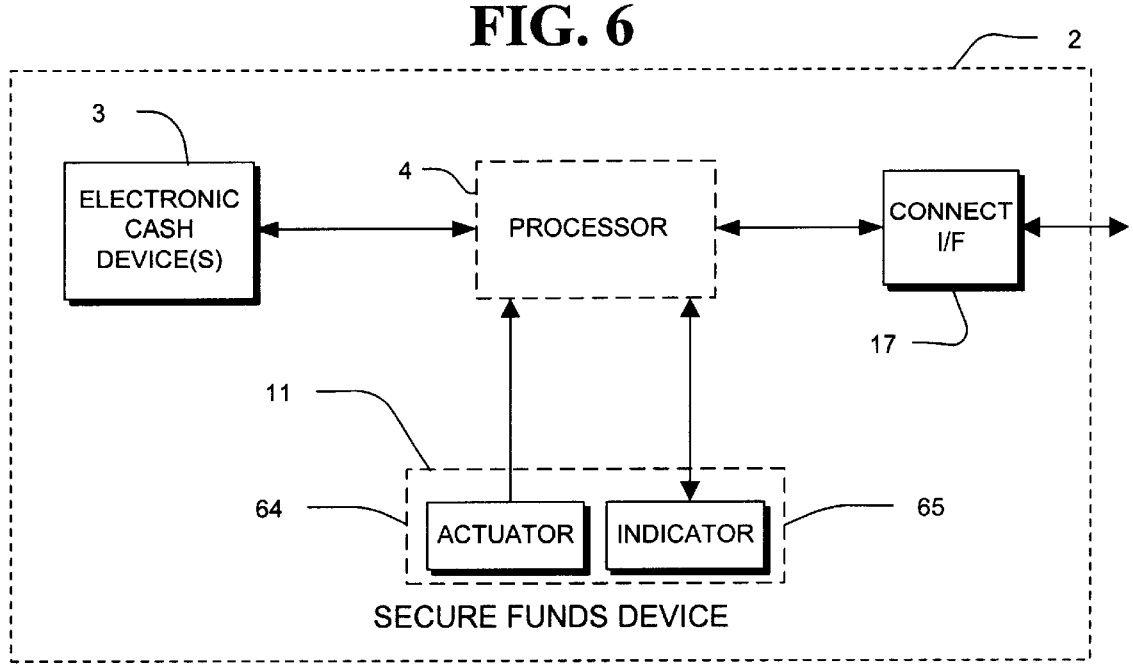
FIG. 6 depicts a block diagram of a funds transfer system that includes an alternate secure funds device of the present invention.

Funds Transfer Phase—FIG. 5

The FUNDS TRANSFER PHASE (FTP) 2-3 of FIG. 2 is shown in flowchart form in FIG. 5. During the FUNDS TRANSFER PHASE 2-3, the secure funds device 2 cooperates with the computer system 7 to perform the electronic signaling required for the transfer of electronic funds to the funds receiver 10 in an aggregate amount not to exceed the authorized amount.

In FIG. 5, the process of the FUNDS TRANSFER PHASE 2-3 starts at FUNDS TRANSFER PHASE START and flows to the CLEAR_REQ test. A YES result from the CLEAR_REQ test flows through the CLEAR_ACK task to generate an FTP/PP_RET return that returns to the PREPARATION PHASE START of FIG. 3. A NO result to the CLEAR_REQ test flows to the STEADY task which displays on output 61 the amount of funds currently available for transfer (DISP_AMT) as a steady value. The STEADY task flows to the IMMED_XFR=YES test.

Further flow in the FUNDS TRANSFER PHASE 2-3 depends on whether the FUNDS TRANSFER PHASE 2-3 was entered as a result of an immediate action XFR_REQ request, or as a result of an AUTH_REQ request.

Immediate Funds Transfer

The flow for the immediate funds transfer path starts from the YES result from IMMED_XFR=YES test. The YES result to the IMMED_XFR=YES test flows to the test that determines if the amount requested is less than or equal to the amount previously authorized (AMT≦DISP_AMT test). In the immediate funds transfer flow, the two values will be equal and the YES result to the test flows to the task which actually completes transfer of value from device 3 to funds receiver 10 (TRANSFER_AMT task). The flow from the TRANSFER_AMT task is to the successful transfer completion test (TRANSFER_OK test) that tests whether the transfer of funds was actually completed. A transfer might fail for any number of reasons, including insufficient funds in the electronic cash device 3 or a loss of communications to the funds receiver 10. In many cases, it may be desirable to retry a failed transfer a number of times before signaling a failure. If the ultimate result of the TRANSFER_OK test is a NO result, the immediate transfer flow ends with a flow to the REQ_NAK task sends a REQ_NAK acknowledgment response to the computer system 7 that indicates acknowledgment that XFR_REQ request did not complete successfully and that generates the FTP/PP_RET return that returns to the PREPARATION PHASE START of FIG. 3. If the result of the TRANSFER_OK test is a YES result, the immediate operation flow is to the decrement task (DISP_AMT←DISP_AMT-AMT task) that reduces the display amount (DISP_AMT) by the transfer amount (AMT). In the immediate funds transfer flow, the result of this computation will be zero. The flow from the DISP_AMT←DISP_AMT-AMT task is to the REQ_ACK task that sends an REQ_ACK acknowledge response to the computer system 7 that indicate acknowledgment that XFR_REQ request completed successfully. The flow from the REQ_ACK task is to the display amount greater than zero test (DISP_AMT>0 test). The DISP_AMT>0 test returns YES if the aggregate amount of funds transferred is less than the most previously authorized amount, and returns a NO result otherwise. In this path the result of the DISP_AMT>0 test will be a NO result indicating a funds exhausted condition, and an FTP/PP_RET return will be generated to return to the PREPARATION PHASE START of FIG. 3.

Transfer Request Loop Operation

If the result of the IMMED_XFR=YES test is NO, the FUNDS TRANSFER PHASE 2-3 was entered as the result of the authorization of a previous AUTH_REQ request, thus enabling loop operation with subsequent XFR_REQ requests.

In FIG. 5, a repeating loop for repeated transfers after an initial authorization is shown by bold lines and starts with the clear test (CLEAR_REQ test). A NO result from the CLEAR_REQ test flows to the STEADY task which displays the funds amount as a steady value and then flows to the IMMED_REQ=YES test, which in the transfer loop operation flow will return a NO result and flow to the new transfer request test (XFR_REQ test). If the result of the XFR_REQ test is a YES result, the flow is to the (AMT≦DISP_AMT test). If the result of the AMT≦DISP_AMT test is a NO result, the loop terminates a flow to the REQ_NAK task sends a REQ_NAK acknowledgment response to the computer system 7 that indicates acknowledgment that XFR_REQ request did not completed successfully and that generates the FTP/PP_RET return that returns to the PREPARATION PHASE START of FIG. 3. If the result of the AMT≦DISP_AMT test is a YES result, the flow is to the TRANSFER_AMT task and to the TRANSFER_OK test. If the result of the TRANSFER_OK test is a YES result, the flow is to the DISP_AMT←DISP_AMT-AMT task and to the REQ_ACK task that sends an REQ_ACK acknowledge response to the computer system 7 that indicate acknowledgment that XFR_REQ request completed successfully. The flow from the REQ_ACK task is the DISP_AMT>0 test. If the result of the DISP_AMT>0 is a NO result, the transfer loop flow is terminated with a return to the PREPARATION PHASE START of FIG. 3. If the result of the DISP_AMT>0 is a YES result, the transfer loop flow returns to the CLEAR_REQ test after the FUNDS TRANSFER PHASE START. The multiple transfers from a one or more authorizations continues unless terminated for any of the reasons described. If, for any pass of the bolded repeating transfer loop, no transfer request is pending, then the transfer loop is abbreviated into an idle loop shown by dotted lines from a NO result for a XFR_REQ and a NO result for a AUTH_REQ returning back to the CLEAR_REQ test of FIG. 5.

Authorization Update Operation

In FIG. 5, the repeating loop may be interrupted by an AUTH_REQ that updates the amount authorized for transfers. After update, the Transfer Request Loop Operation resumes using the new authorized amount. The authorization update operation starts with the AUTH_REQ test reached as the consequence of a NO result to the XFR_REQ test.

If the result of the AUTH_REQ test is a YES result, the flow is to the BLANK in anticipation of further action in the AUTHORIZATION PHASE 2-2. The flow from the BLANK task is to the display amount task (DISP_AMT AMT task) that sets the amount displayed by output 61 to amount (AMT) included with the AUTH_REQ request. The flow from the DISP_AMT←AMT task is to the AUTHORIZATION PHASE START of FIG. 4. This flow provides for the case where the computer system 7 operates to replace previously authorized funds with a new AMT of authorized funds.

As an alternative, instead of replacing a previously authorized amount with a new AMT, the new request could be to add the new parameter amount AMT to the remaining DISP_AMT remaining from previous authorizations. Also, funds transfer could continue during a new authorization as long as the aggregate does not exceed the amount currently authorized.

A session ends and a return is made when the transfer limit is reached, the smart card is removed or deactivated, or on some other condition agreed by the secure funds device 2 and the computer system 7. After any session ends, the process restarts from the PREPARATION PHASE 2-1 of FIG. 3.

Further And Other Embodiments—FIG. 6–FIG. 9.

FIG. 6, FIG. 7, FIG. 8 and FIG. 9 depict a secure funds devices 2 like that in FIG. 1 in which the one or more individual electronic cash devices 3, processor(s) 4, connect interface 17 and user control means 11, including actuator 64 and indicator 65, function to control the authorized dispensing of electronic funds from the electronic cash devices 3 to the funds receivers in FIG. 1. In the FIG. 6 embodiment, the electronic cash devices 3 are part of the secure funds device 2 and no special packaging, such as a smart card, need be present.

Figure 7:
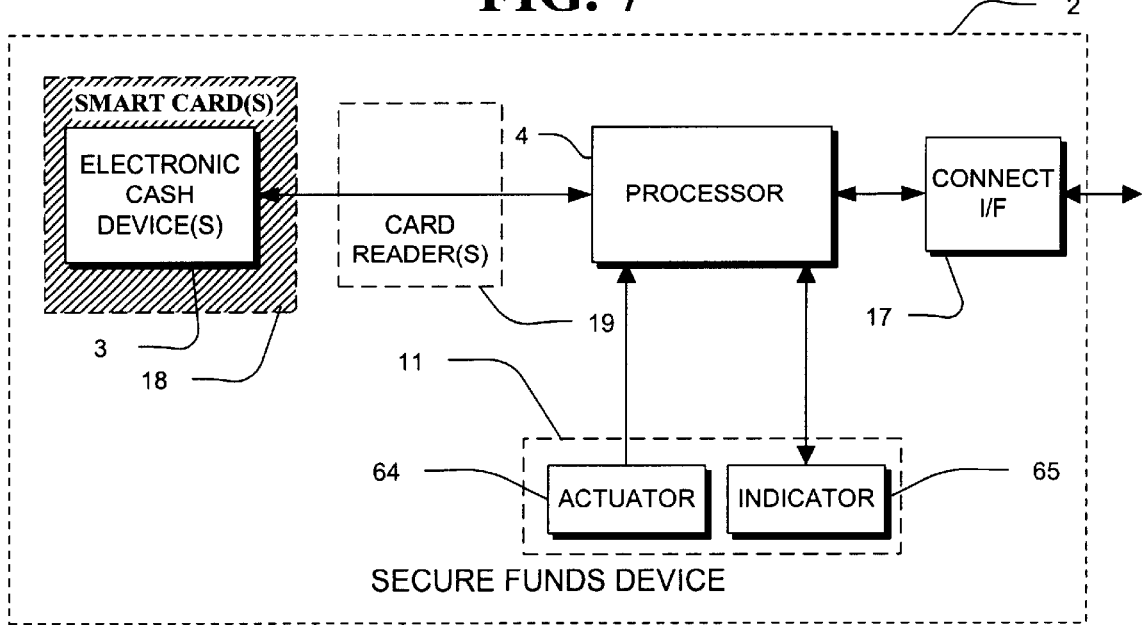
FIG. 7 depicts a block diagram of a funds transfer system that includes an alternate secure funds device of the present invention.

In the FIG. 7 embodiment, each of one or more electronic cash device(s) 3 and corresponding processor 4 are part of the secure funds device 2 and are packaged as one or more smart cards 18 which operate through one or more card readers 19 to connect through the connect interface 17 to the computer 7 of FIG. 1.

Figure 8:
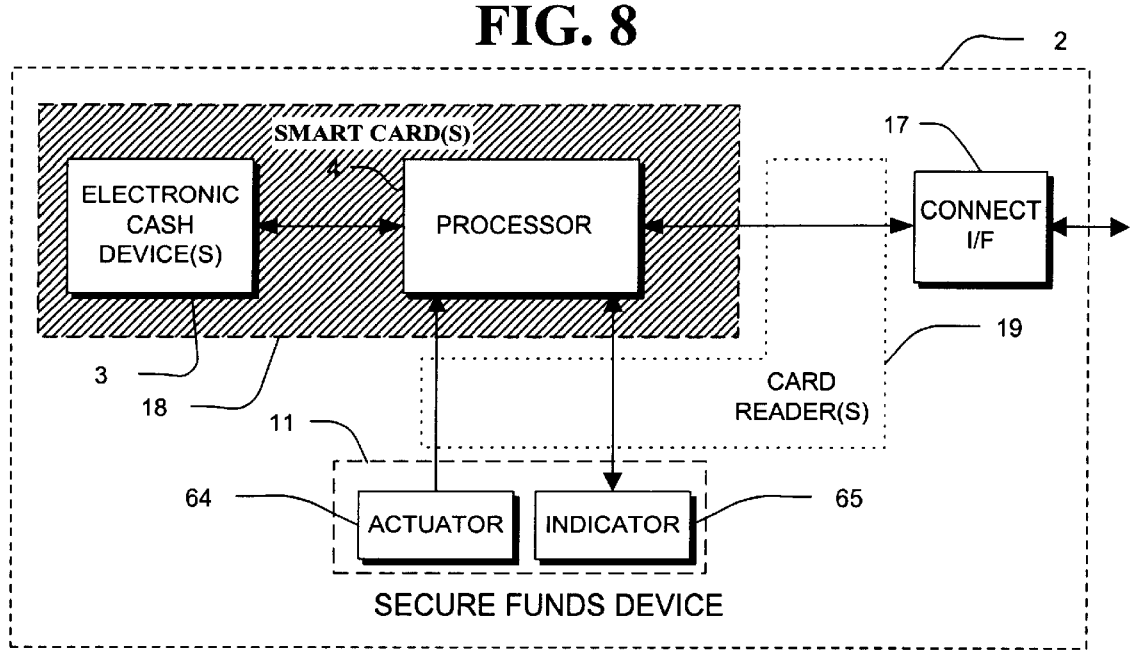
FIG. 8 depicts a block diagram of a funds transfer system that includes an alternate secure funds device of the present invention.

In the FIG. 8 embodiment, each of one or more electronic cash devices 3 and corresponding processor 4 are packaged as one or more smart cards 18 which operate through one or more card readers 19 to connect through connect interface 17 to the computer 7 of FIG. 1.

Figure 9:
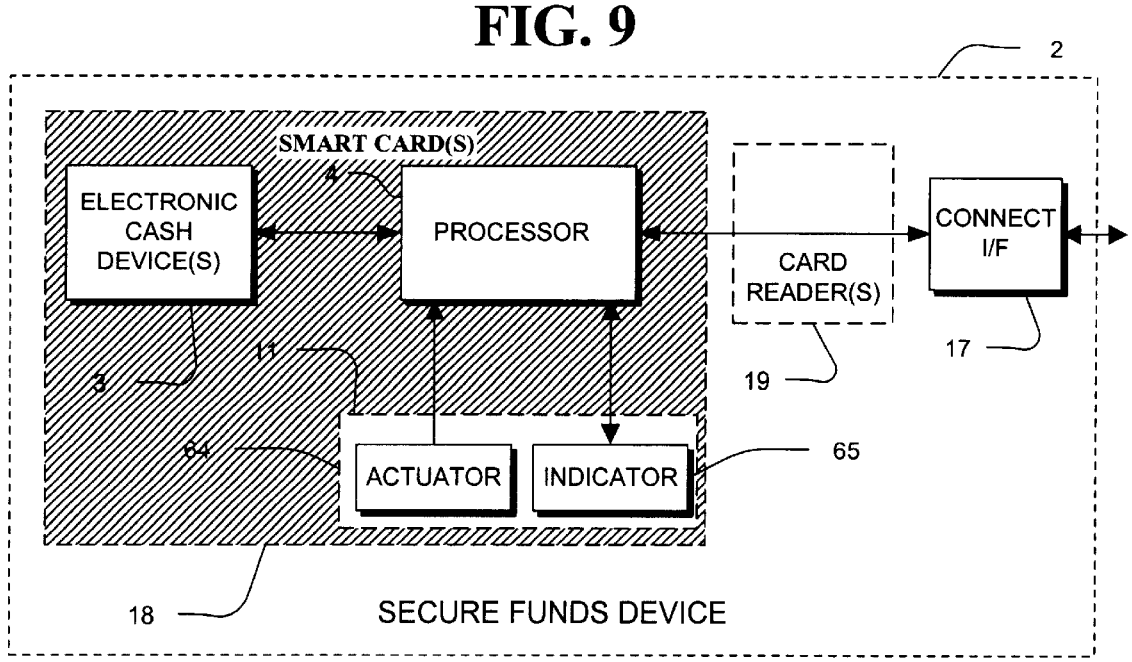
FIG. 9 depicts a block diagram of a funds transfer system that includes an alternate secure funds device of the present invention.

In the FIG. 9 embodiment, each of one or more electronic cash devices 3 and corresponding processor 4, each of one or more user control devices 11 including actuators 64 and indicators 65 are packaged as one or more smart cards 18 which operate through one or more card readers 19 to connect through connect interface 17 to the computer 7 of FIG. 1.

In the embodiments of FIG. 7, FIG. 8 and FIG. 9, the smart cards 18 are devices containing internal and integrated electronic components that are packaged using semiconductor chip packaging technology. Such smart cards with current technology typically can be similar in form and size to a common credit card or approximately one-half by one inch in size or smaller.

In the embodiments of FIG. 7, FIG. 8 and FIG. 9, various elements of the secure funds device 2 were packaged as smart cards. The present invention contemplates that any combination of elements can be selected for inclusion within smart card packaging. For example, the indicator 65 may be within or without the smart card independently of whether the actuator 64 is within or without the smart card 18.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A secure funds device for use with a computer system for transferring funds from an electronic cash device to a funds receiver comprising:

a processor isolated from the computer system for connecting a funds transfer request in a requested amount originating from the computer system to the electronic cash device and for transferring electronic funds in a transfer amount not exceeding said requested amount from the electronic cash device to the computer system in response to an authorization signal, user control means, under physical control and security of a user, including an indicator for providing an indication of the requested amount and including an actuator, on user momentary actuation, producing said authorization signal, secure from unauthorized intervention by the computer system, transmitting the authorization signal via said processor to the funds receiver.

2. The secure funds device of claim 1 wherein said indicator includes a user display for display of said requested amount.

3. The secure funds device of claim 1 wherein said indicator includes a user speaker for audio indication of said requested amount.

4. The secure funds device of claim 1 wherein said processor includes means for storing said requested amount and means for allowing transfer of a transfer amount that does not exceed said requested amount.

5. The secure funds device of claim 1 wherein said processor includes means for storing said requested amount and means for allowing transfer of a transfer amount that equals said requested amount.

6. The secure funds device of claim 1 wherein said processor includes means for storing said requested amount and means for allowing one or more transfers of one or more transfer amounts that cumulatively do not exceed said requested amount.

7. The secure funds device of claim 1 wherein said processor includes means for storing an authorized amount as an accumulated result of multiple authorization transfers and means for allowing one or more transfers of one or more transfer request amounts that cumulatively do not exceed said authorized amount.

8. The secure funds device of claim 1 wherein said processor operates in a session having a plurality of phases including,
   a preparation phase, an authorization phase and a funds transfer phase.

9. The secure funds device of claim 8 wherein said session allows multiple transfers in said funds transfer phase subsequent to said authorization phase.

10. The secure funds device of claim 8 wherein for a session,
    said preparation phase determines if the electronic cash device is ready and determines if a request is pending in the requested amount,
    said authorization phase displays said requested amount and generates the authorization signal,
    said funds transfer phase, cooperating with the computing system, performs the electronic signaling required for the transfer of electronic funds between the electronic cash device and the funds receiver.

11. The secure funds device of claim 10 wherein said funds transfer phase returns to the preparation phase or the authorization phase in response to return conditions so that further funds transfers cannot occur without a new authorization.

12. The secure funds device of claim 11 wherein said return conditions include an electronic cash device not OK condition.

13. The secure funds device of claim 11 wherein said return conditions include a clear request condition.

14. The secure funds device of claim 11 wherein said return conditions include a funds exhausted condition.

15. A secure funds device for use with a computer system for transferring funds from an electronic cash device to a funds receiver comprising:
    a housing physically detached from said computer system and electronically connected for communication with the computer system, said housing containing,
       a processor for connecting a funds transfer request, in a preparation phase, in a requested amount originating from the computer system to the electronic cash device and for transferring electronic funds, in a funds transfer phase, in a transfer amount not exceeding said requested amount from the electronic cash device to the computer system in response to an authorization signal, said processor having means to inhibit responses to funds transfer requests from the computer system until an authorization signal is generated,
       user control means including an indicator for producing an indication of the requested amount and including an actuator for producing, in an authorization phase, said authorization signal secure from unauthorized intervention by the computer system.

16. The secure funds device of claim 15 wherein said indicator includes a user display for display of said requested amount.

17. The secure funds device of claim 15 wherein said indicator includes a user speaker for audio indication of said requested amount.

18. The secure funds device of claim 15 wherein said processor includes means for storing said requested amount and means for allowing transfer of a transfer amount that does not exceed said requested amount.

19. The secure funds device of claim 15 wherein said processor includes means for storing said requested amount and means for allowing transfer of a transfer amount that equals said requested amount.

20. The secure funds device of claim 15 wherein said processor includes means for storing said requested amount and means for allowing one or more transfers of one or more transfer amounts that cumulatively do not exceed said requested amount.

21. The secure funds device of claim 15 wherein said processor includes means for storing an authorized amount as an accumulated result of multiple authorization transfers and means for allowing one or more transfers of one or more transfer request amounts that cumulatively do not exceed said authorized amount.

22. The secure funds device of claim 15 wherein a session includes in sequence said preparation phase, said funds transfer phase and said authorization phase and said session allows multiple transfers in said funds transfer phase subsequent to said authorization phase.

23. The secure funds device of claim 22 wherein for a session,
    said preparation phase determines if the electronic cash device is ready and determines if a request is pending in the requested amount,
    said authorization phase displays said requested amount and generates the authorization signal,
    said funds transfer phase, cooperating with the computing system, performs the electronic signaling required for the transfer of electronic funds between the electronic cash device and the funds receiver.

24. The secure funds device of claim 23 wherein said funds transfer phase returns to the preparation phase or the authorization phase in response to return conditions so that further funds transfers cannot occur without a new authorization.

25. The secure funds device of claim 24 wherein said return conditions include an electronic cash device not OK condition.

26. The secure funds device of claim 24 wherein said return conditions include a clear request condition.

27. The secure funds device of claim 24 wherein said return conditions include a funds exhausted condition.

28. A secure funds device for use with a computer system for transferring electronic funds between an electronic cash device and an electronic funds receiver comprising:
    a housing physically detached and securely isolated from said computer system and electronically connected for communication with the computer system, said housing containing,
       a secure processor for connecting a funds transfer request from the computer system to the electronic cash device and for transferring electronic funds in a requested amount between the electronic cash device and the computer system in response to an authorization signal, said processor including means for storing an authorized amount and operating for allowing one or more transfers of one or more transfer request amounts that cumulatively do not exceed said authorized amount, said processor operating in a session having a plurality of distinct phases including a preparation phase, an authorization phase and a funds transfer phase wherein, said preparation phase determines if the electronic cash device is ready and determines if a request from the computer system is pending in the requested amount, said authorization phase displays said requested amount and generates the authorization signal, said funds transfer phase, cooperating with the computing system, performs the electronic signaling required for the transfer of electronic funds between the electronic cash device and the funds receiver, said session allows multiple transfers in said funds transfer phase subsequent to said authorization phase, user control means under physical control and security of a user for producing said authorization signal secure from unauthorized intervention by the computer system, said user control means including a user indicator for indication of the amount of the funds transfer request and a manual actuator for actuation by a user for generation of said authorization signal, transmitting the funds and said authorization to the electronic funds receiver.

29. A secure funds method for use in a computer system for transferring funds from an electronic cash device to a funds receiver comprising:

connecting, with a processor, a funds transfer request in a requested amount originating from the computer system to the electronic cash device and for transferring electronic funds in a transfer amount not exceeding said requested amount from the electronic cash device to the computer system in response to an authorization signal, transmitting with user control means, under physical control and security of a user and secure from unauthorized intervention by the computer system, having an indicator for indicating the amount and having an actuator producing the authorization signal on user momentary actuation, an indication of the requested amount and said authorization signal to the funds receiver.

30. The secure funds method of claim 29 wherein said indicator includes a user display for display of said requested amount.

31. The secure funds method of claim 29 wherein said indicator includes a user speaker for audio indication of said requested amount.

32. The secure funds method of claim 29 wherein said processor includes means for storing said requested amount and means for allowing transfer of a transfer amount that does not exceed said requested amount.

33. The secure funds method of claim 29 wherein said processor includes means for storing said requested amount and means for allowing transfer of a transfer amount that equals said requested amount.

34. The secure funds method of claim 29 wherein said processor includes means for storing said requested amount and means for allowing one or more transfers of one or more transfer amounts that cumulatively do not exceed said requested amount.

35. The secure funds method of claim 29 wherein said processor includes means for storing an authorized amount as an accumulated result of multiple authorization transfers and means for allowing one or more transfers of one or more transfer request amounts that cumulatively do not exceed said authorized amount.

36. The secure funds method of claim 29 wherein said processor operates in a session having a plurality of phases including, a preparation phase, an authorization phase and a funds transfer phase.

37. The secure funds method of claim 36 wherein said session allows multiple transfers in said funds transfer phase subsequent to said authorization phase.

38. The secure funds method of claim 36 wherein for a session, said preparation phase determines if the electronic cash device is ready and determines if a request is pending in the requested amount, said authorization phase displays said requested amount and generates the authorization signal, said funds transfer phase, cooperating with the computing system, performs the electronic signaling required for the transfer of electronic funds between the electronic cash device and the funds receiver.

39. The secure funds method of claim 38 wherein said funds transfer phase returns to the preparation phase or the authorization phase in response to return conditions so that further funds transfers cannot occur without a new authorization.

40. The secure funds method of claim 39 wherein said return conditions include an electronic cash device not OK condition.

41. The secure funds method of claim 39 wherein said return conditions include a clear request condition.

42. The secure funds method of claim 39 wherein said return conditions include a funds exhausted condition.

43. A secure funds method for use in a computer system for transferring funds from an electronic cash device to a funds receiver comprising:

electronically connecting and communicating with the computer system, using a housing physically detached from said computer system, including, connecting, with a processor, a funds transfer request, in a preparation phase, in a requested amount originating from the computer system to the electronic cash device and for transferring electronic funds, in a funds transfer phase, in a transfer amount not exceeding said requested amount from the electronic cash device to the computer system in response to an authorization signal, said processor having means to inhibit responses to funds transfer requests from the computer system until an authorization signal is generated, sending with user control means, under physical control and security of a user, having an indicator for an indication of the requested amount and having an actuator for producing said authorization signal when momentarily actuated by the user, in an authorization phase, said indication of the requested amount and the authorization signal, secure from unauthorized intervention by the computer system, to the funds receiver.

44. The secure funds method of claim 43 wherein said indicator includes a user display for display of said requested amount.

45. The secure funds method of claim 43 wherein said indicator includes a user speaker for audio indication of said requested amount.

46. The secure funds method of claim 43 wherein said processor includes means for storing said requested amount and means for allowing transfer of a transfer amount that does not exceed said requested amount.

47. The secure funds method of claim 43 wherein said processor includes means for storing said requested amount and means for allowing transfer of a transfer amount that equals said requested amount.

48. The secure funds method of claim 43 wherein said processor includes means for storing said requested amount and means for allowing one or more transfers of one or more transfer amounts that cumulatively do not exceed said requested amount.

49. The secure funds method of claim 43 wherein said processor includes means for storing an authorized amount as an accumulated result of multiple authorization transfers and means for allowing one or more transfers of one or more transfer request amounts that cumulatively do not exceed said authorized amount.

50. The secure funds method of claim 43 wherein a session includes in sequence said preparation phase, said funds transfer phase and said authorization phase and said session allows multiple transfers in said funds transfer phase subsequent to said authorization phase.

51. The secure funds method of claim 50 wherein for a session,
said preparation phase determines if the electronic cash device is ready and determines if a request is pending in the requested amount,
said authorization phase displays said requested amount and generates the authorization signal,
said funds transfer phase, cooperating with the computing system, performs the electronic signaling required for the transfer of electronic funds between the electronic cash device and the funds receiver.

52. The secure funds method of claim 51 wherein said funds transfer phase returns to the preparation phase or the authorization phase in response to return conditions so that further funds transfers cannot occur without a new authorization.

53. The secure funds method of claim 52 wherein said return conditions include an electronic cash device not OK condition.

54. The secure funds method of claim 52 wherein said return conditions include a clear request condition.

55. The secure funds method of claim 52 wherein said return conditions include a funds exhausted condition.

56. A secure funds method for use in a computer system for transferring electronic funds between an electronic cash device and an electronic funds receiver comprising:
electronically connecting and communicating with the computer system, using a housing physically detached and securely isolated from said computer system, including,
connecting, with a secure processor, a funds transfer request from the computer system to the electronic cash device and transferring electronic funds in a requested amount between the electronic cash device and the computer system in response to an authorization signal, said processor including means for storing an authorized amount and operating for allowing one or more transfers of one or more transfer request amounts that cumulatively do not exceed said authorized amount, said processor operating in a session having a plurality of distinct phases including a preparation phase, an authorization phase and a funds transfer phase wherein,
said preparation phase determines if the electronic cash device is ready and determines if a request from the computer system is pending in the requested amount,
said authorization phase displays said requested amount and generates the authorization signal,
said funds transfer phase, cooperating with the computing system, performs the electronic signaling required for the transfer of electronic funds between the electronic cash device and the funds receiver,
said session allows multiple transfers in said funds transfer phase subsequent to said authorization phase,
producing, with a user control means transportable by a user and under physical control and security of a user, said authorization signal secure from unauthorized intervention by the computer system, including indicating, with a user indicator, the amount of the funds transfer request and generating, with a manual actuator actuated by a user, said authorization signal, transmitting the funds and said authorization to the electronic funds receiver.

57. A secure funds device for use with a computer system for transferring funds from a secure funds device to a funds receiver comprising:
a housing physically detached from said computer system and electronically connected for communication with the computer system, said housing containing,
an electronic cash device for storing electronic funds,
a processor for connecting a funds transfer request, in a preparation phase, in a requested amount originating from the computer system to the electronic cash device and for transferring electronic funds, in a funds transfer phase, in a transfer amount not exceeding said requested amount from the electronic cash device through a connection interface to the computer system in response to an authorization signal, said processor having means to inhibit responses to funds transfer requests from the computer system until an authorization signal is generated,
user control means including an indicator for providing an indication of the requested amount and including an actuator for producing, in an authorization phase, said authorization signal secure from unauthorized intervention by the computer system, sending the amount and said authorization signal to the funds receiver.

58. The secure funds device of claim 57 wherein said electronic cash device is embedded in a smart card and said secure funds device includes a card reader for communicating with said smart card.

59. The secure funds device of claim 57 wherein said electronic cash device and said processor are embedded in a smart card and said secure funds device includes a card reader for communicating with said smart card.

60. The secure funds device of claim 57 wherein said electronic cash device, said user control means and said processor are embedded in a smart card and said secure funds device includes a card reader for communicating with said smart card.

* * * * *